(12) United States Patent
Maruyama

(10) Patent No.: US 12,226,897 B2
(45) Date of Patent: Feb. 18, 2025

(54) TEACHING METHOD

(71) Applicant: SEIKO EPSON CORPORATION, Tokyo (JP)

(72) Inventor: Yuya Maruyama, Fuefuki (JP)

(73) Assignee: SEIKO EPSON CORPORATION (JP)

( * ) Notice: Subject to any disclaimer, the term of this patent is extended or adjusted under 35 U.S.C. 154(b) by 227 days.

(21) Appl. No.: 17/943,521

(22) Filed: Sep. 13, 2022

(65) Prior Publication Data

US 2023/0078238 A1     Mar. 16, 2023

(51) Int. Cl.
| | |
|---|---|
| B25J 9/00 | (2006.01) |
| B25J 9/16 | (2006.01) |
| B25J 13/08 | (2006.01) |
| B25J 19/02 | (2006.01) |

(52) U.S. Cl.
CPC ........... *B25J 9/0081* (2013.01); *B25J 9/1697* (2013.01); *B25J 13/089* (2013.01); *B25J 19/023* (2013.01)

(58) Field of Classification Search
CPC ...... B25J 9/0081; B25J 9/1697; B25J 13/089; B25J 19/023; G05B 2219/40564; G05B 19/42
USPC .......................................................... 700/264
See application file for complete search history.

(56) References Cited

U.S. PATENT DOCUMENTS

| | | | | |
|---|---|---|---|---|
| 5,615,318 A | * | 3/1997 | Matsuura | G06Q 10/043 345/441 |
| 2003/0055612 A1 | * | 3/2003 | Amakai | G06F 30/23 703/1 |
| 2014/0354630 A1 | * | 12/2014 | Kim | G06T 17/00 345/419 |
| 2015/0246778 A1 | * | 9/2015 | Koga | B65G 47/905 700/259 |
| 2017/0349385 A1 | * | 12/2017 | Moroni | B07C 1/06 |
| 2018/0117766 A1 | * | 5/2018 | Atohira | B25J 9/1671 |
| 2018/0164788 A1 | * | 6/2018 | Shimamura | B25J 9/0093 |
| 2018/0354127 A1 | | 12/2018 | Ando | |

(Continued)

FOREIGN PATENT DOCUMENTS

| | | | | | |
|---|---|---|---|---|---|
| CN | 104876021 A | * | 9/2015 | ............ | B25J 9/1697 |
| CN | 105645010 A | * | 6/2016 | ............ | B25J 9/1664 |

(Continued)

OTHER PUBLICATIONS

Okuyama Masayuki; JP2010089218A. Translate; Seiko Epson Corp; Position Teaching Device of Industrial Robot, Operationalprogram Preparing Device, and Method and Program for Positionteaching of Industrial Robot; (Year: 2010).*

*Primary Examiner* — B M M Hannan
(74) *Attorney, Agent, or Firm* — Harness, Dickey & Pierce, P.L.C.

(57) ABSTRACT

A teaching method for generating an operation program of a robot based on an operation in which an operator sequentially moves a plurality of objects to an arrangement region and arranges the objects so as to form a target arrangement pattern, the teaching method including an imaging step of imaging the object moved to the arrangement region in the operation, a recognizing step of recognizing a position of the object imaged in the imaging step, an estimating step of estimating candidate arrangement patterns based on the position of the object recognized in the recognizing step, and a display step of displaying the candidates estimated in the estimating step.

6 Claims, 12 Drawing Sheets

(56) References Cited

U.S. PATENT DOCUMENTS

| | | | | |
|---|---|---|---|---|
| 2021/0387301 A1* | 12/2021 | O'Hare | ................ | B25J 9/1697 |
| 2022/0241982 A1* | 8/2022 | Oishi | ...................... | G06T 7/50 |
| 2024/0197282 A1* | 6/2024 | Gao | ..................... | A61B 6/542 |

FOREIGN PATENT DOCUMENTS

| | | | | | |
|---|---|---|---|---|---|
| CN | 105645010 | B | * | 11/2017 | ............ B25J 9/1664 |
| CN | 108238395 | A | * | 7/2018 | ........... B65G 1/0421 |
| CN | 108284443 | B | * | 2/2022 | ............ B25J 9/0093 |
| DE | 102015102740 | A1 | * | 9/2015 | ............ B25J 9/1697 |
| DE | 102015015638 | A1 | * | 10/2016 | ............ B25J 9/1664 |
| DE | 102015102740 | B4 | * | 10/2016 | ............ B25J 9/1697 |
| DE | 102017125190 | A1 | * | 5/2018 | .............. B25J 13/08 |
| JP | H0549770 | A | * | 3/1993 | |
| JP | 2008052749 | A | * | 3/2008 | |
| JP | 2010089218 | A | * | 4/2010 | |
| JP | 2015102856 | A | * | 6/2015 | |
| JP | 6346684 | B1 | * | 6/2018 | |
| JP | 2018197873 | A | * | 12/2018 | |
| JP | 2019134391 | A | * | 8/2019 | ....... G06K 19/06037 |
| JP | 2020055096 | A | * | 4/2020 | .............. B25J 11/00 |
| JP | 7197653 | B2 | * | 12/2022 | .............. B25J 15/04 |
| WO | 2017-159562 | A1 | | 9/2017 | |

* cited by examiner

OPERATION PREDICTED CANDIDATES
Please select a candidate for operation. If there are none, continue working.

1 END IN CURRENT STATE

2 REPEAT WITHIN LINE 1.1 REPEAT LINES 2.1 REPEAT LINES 2.1.a REPEAT TYPES

OPERATION PREDICTED CANDIDATES
Please select a candidate for operation. If there are none, continue working.

1 END IN CURRENT STATE

2 REPEAT WITHIN LINE 1.1 REPEAT LINES 2.1 REPEAT LINES 2.1.a REPEAT TYPES 1.2 REPEAT LINES 2.2 REPEAT LINES 2.2.a REPEAT TYPES

TEACHING METHOD

The present application is based on, and claims priority from JP Application Ser. No. 2021-149786, filed Sep. 14, 2021, the disclosure of which is hereby incorporated by reference herein in its entirety.

BACKGROUND

1. Technical Field

The present disclosure relates to a teaching method.

2. Related Art

For example, robots are known that include a robotic arm having a tool, as an end effector, attached to a tip end of the robotic arm and that perform a predetermined operation against a workpiece by driving the robotic arm. In such a robot, before the operation is performed, teaching is performed that creates an operation program and stores the created operation program.

For example, a teaching method wherein an operator performs the operation to be performed by the robot, and the movement of the operator is detected and taught, is disclosed in WO2017/159562.

However, in the teaching method described in WO2017/159562, it is necessary to perform the operation to be taught one or more times from the beginning to the end. Therefore, it takes time to teach.

SUMMARY

A teaching method of the present disclosure is a teaching method for generating an operation program of a robot based on an operation in which an operator sequentially moves a plurality of objects to an arrangement region and arranges the objects so as to form a target arrangement pattern, the teaching method including, an imaging step of imaging the object moved to the arrangement region in the operation, a recognizing step of recognizing a position of the object imaged in the imaging step, an estimating step of estimating candidate arrangement patterns based on the position of the object recognized in the recognizing step, and a display step of displaying the candidates estimated in the estimating step.

DESCRIPTION OF EMBODIMENTS

First Embodiment

Figure 1:
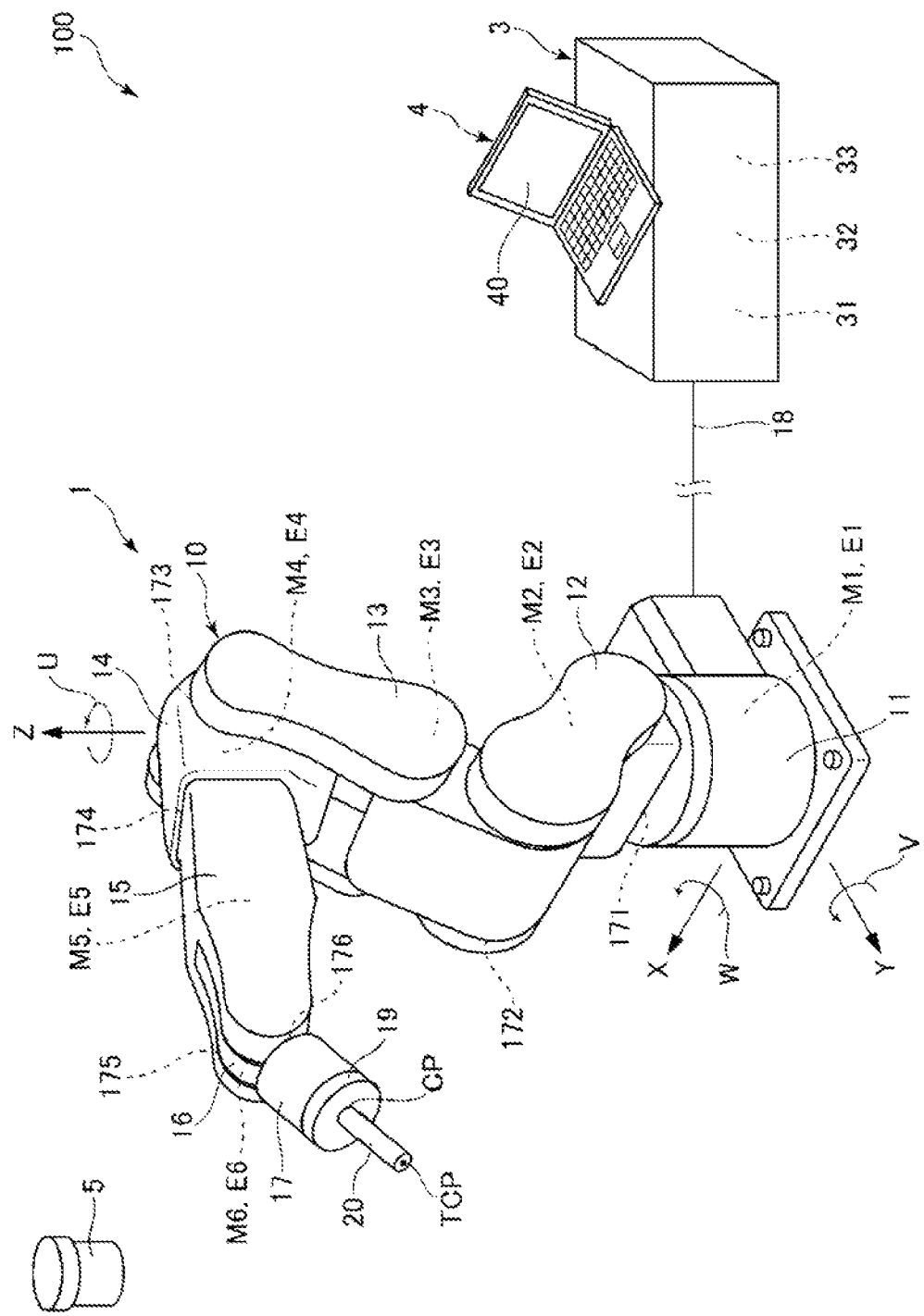
FIG. 1 is a diagram showing overall configuration of a robotic system according to a first embodiment.
Figure 2:
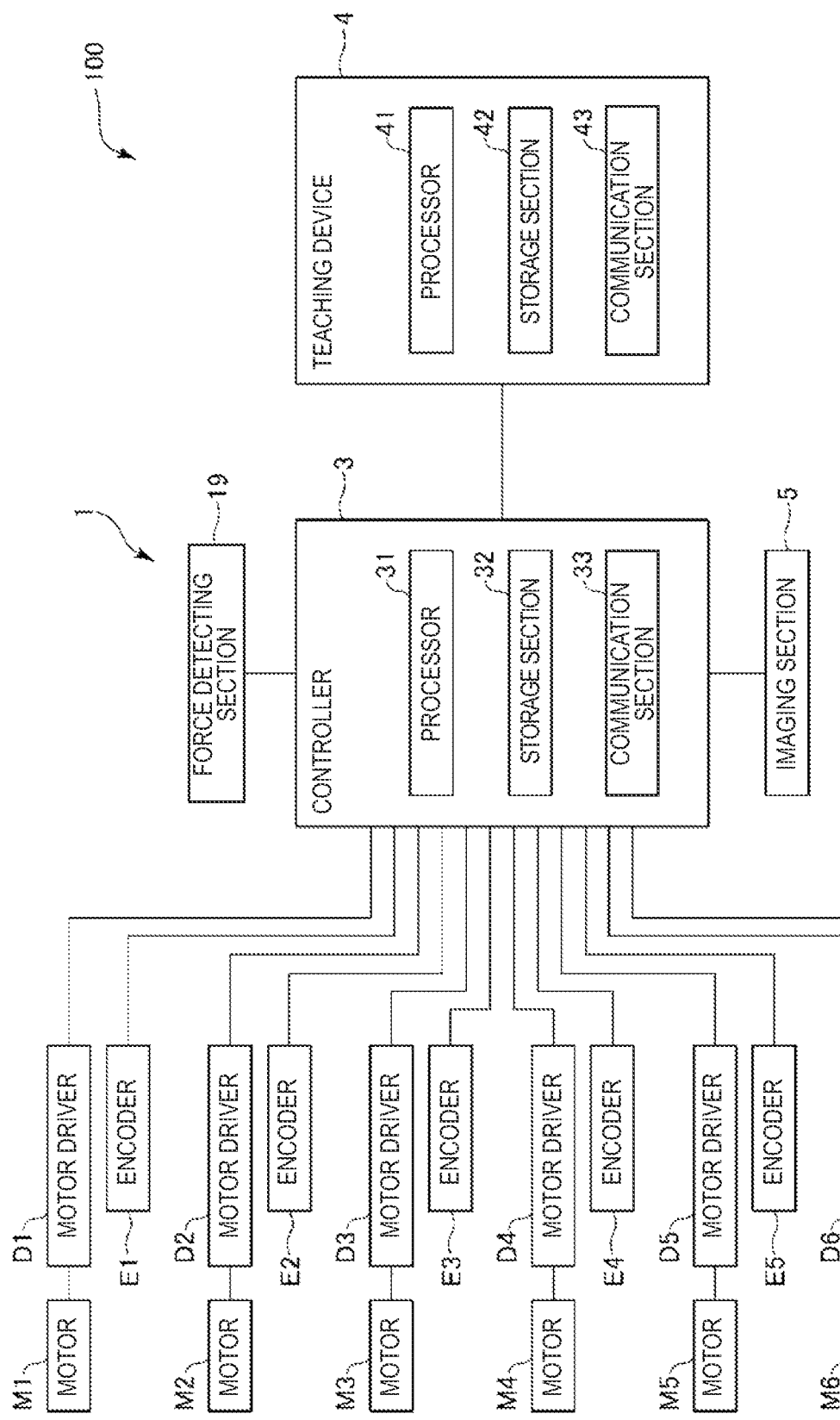
FIG. 2 is a block diagram of the robotic system shown in FIG. 1.
Figure 3:
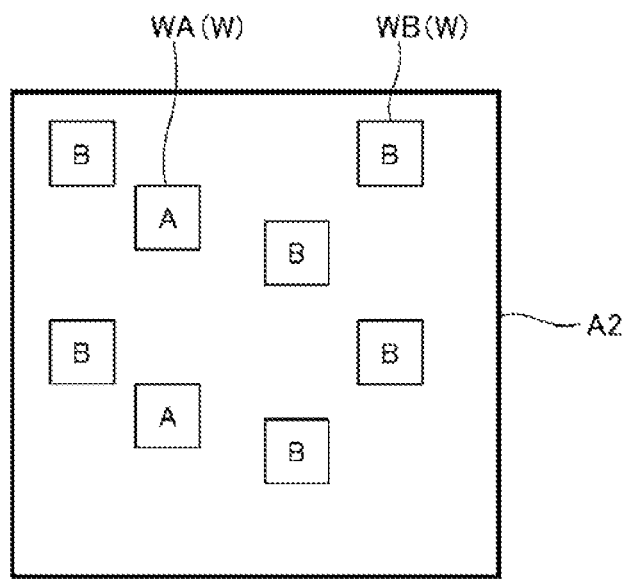
FIG. 3 is a diagram illustrating an example of a target arrangement pattern.
Figure 4:
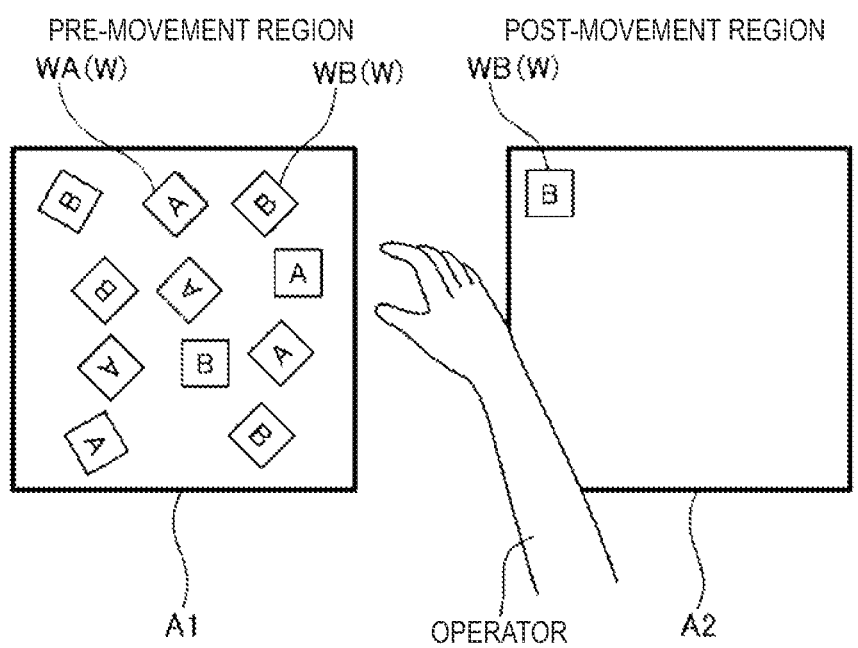
FIG. 4 is an imaging result in which a state of performing a model operation is imaged.
Figure 5:
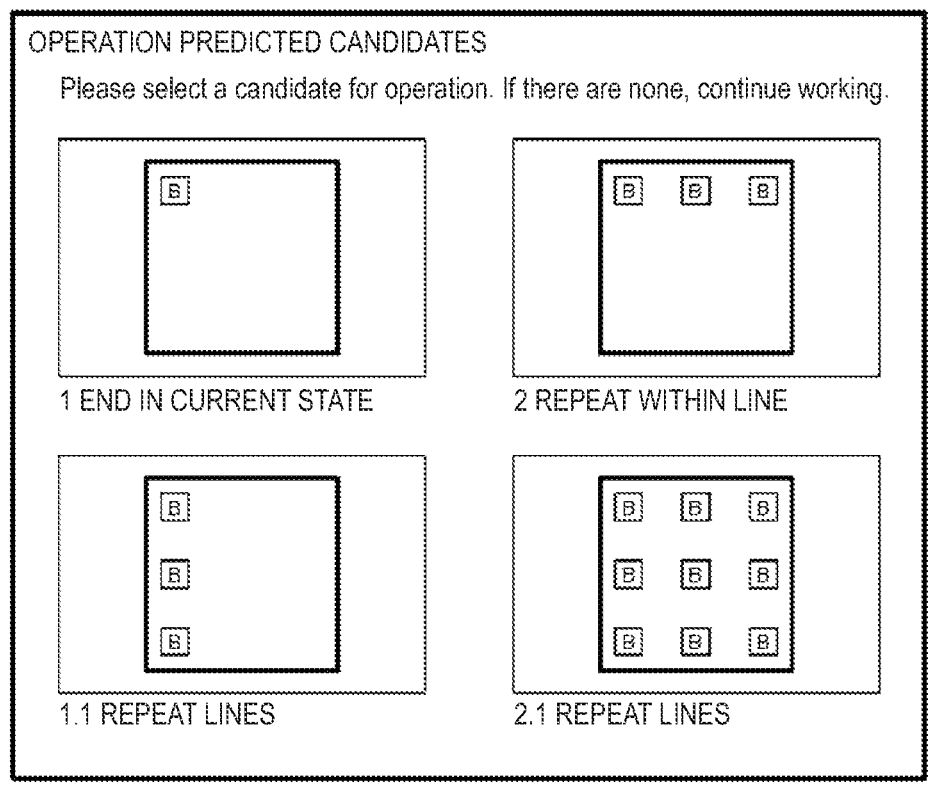
FIG. 5 is a list of candidate arrangement patterns displayed on a display section.
Figure 6:
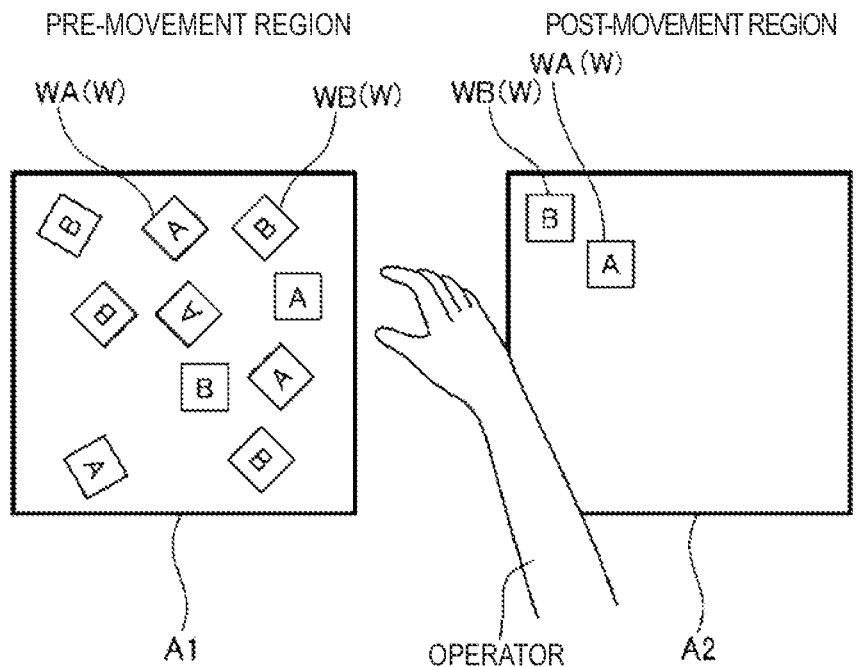
FIG. 6 is an imaging result in which a state of performing a model operation is imaged.
Figure 7:
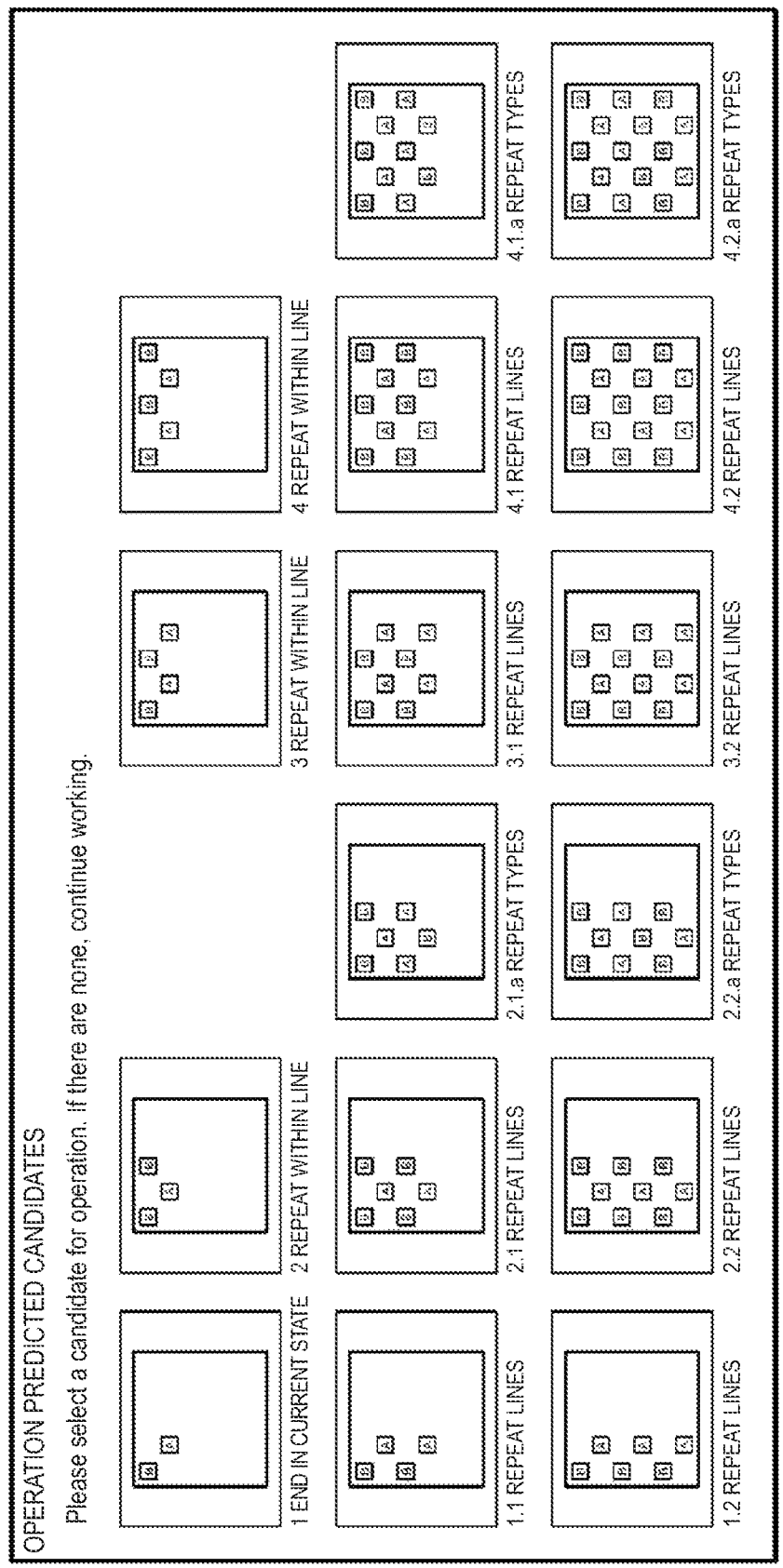
FIG. 7 is a list of candidate arrangement patterns displayed on the display section.
Figure 8:
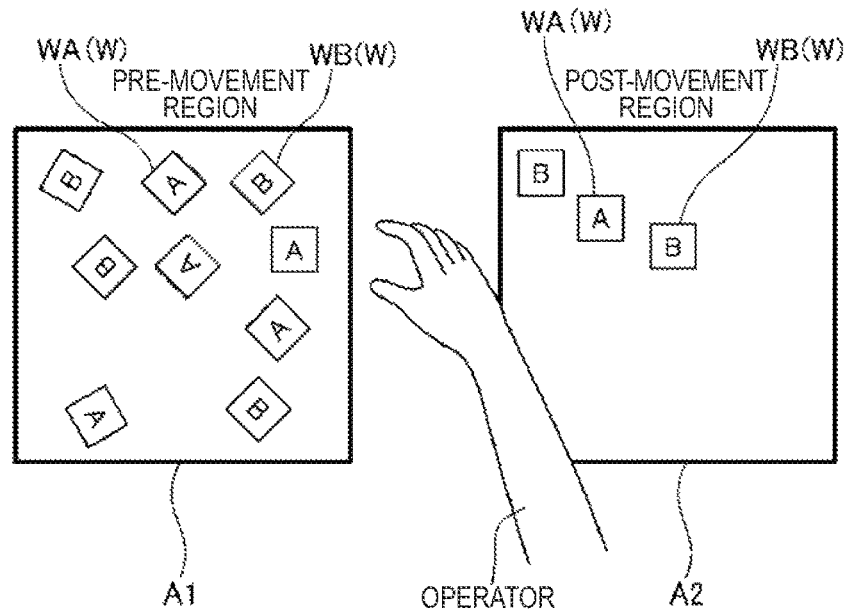
FIG. 8 is an imaging result in which a state of performing a model operation is imaged.
Figure 9:
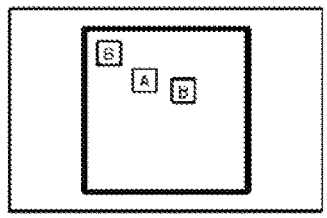
FIG. 9 is a list of candidate arrangement patterns displayed on the display section.
Figure 9:
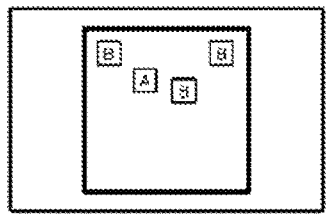
Figure 9:
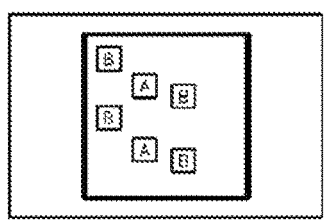
Figure 9:
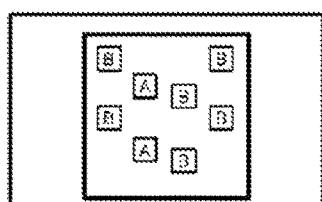
Figure 9:
Figure 9:
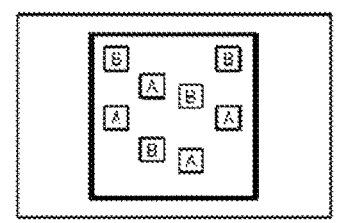
Figure 10:
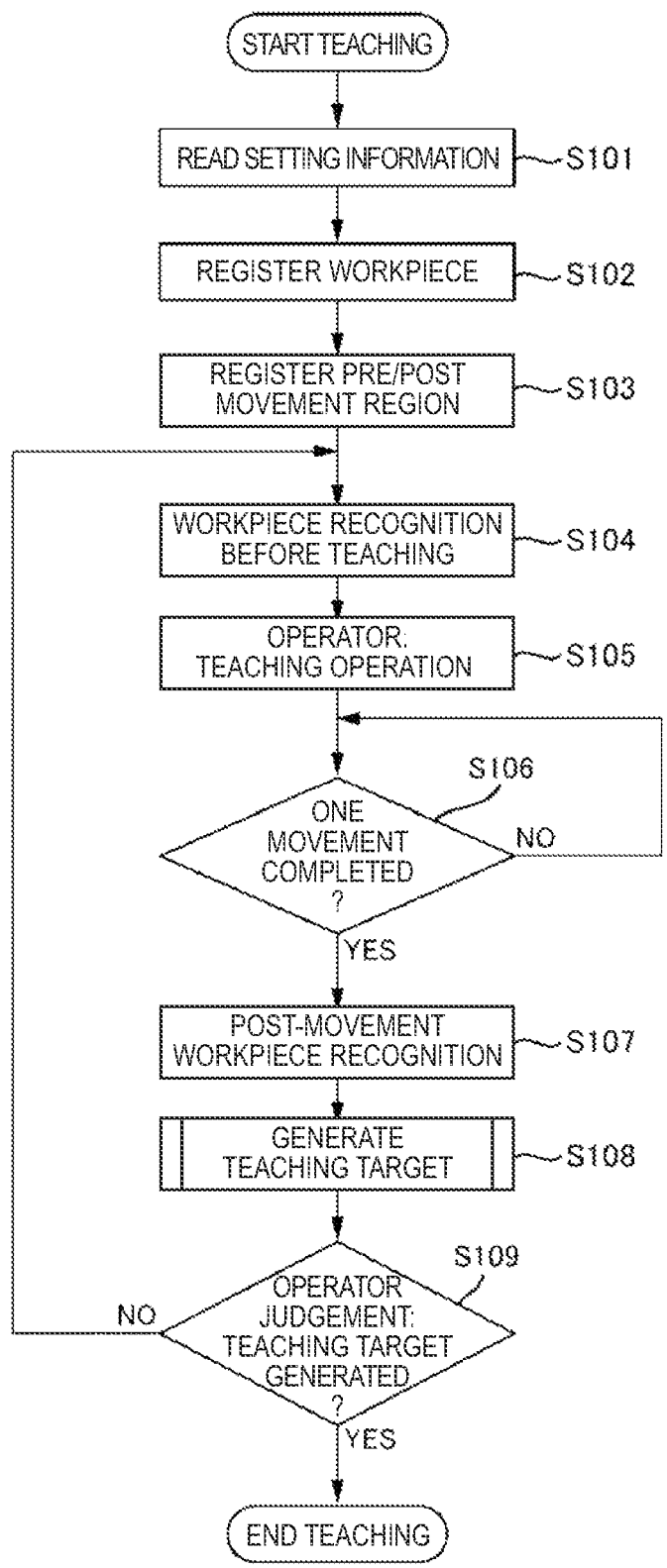
FIG. 10 is a flowchart for explaining an example of the teaching method of the present disclosure.
Figure 11:
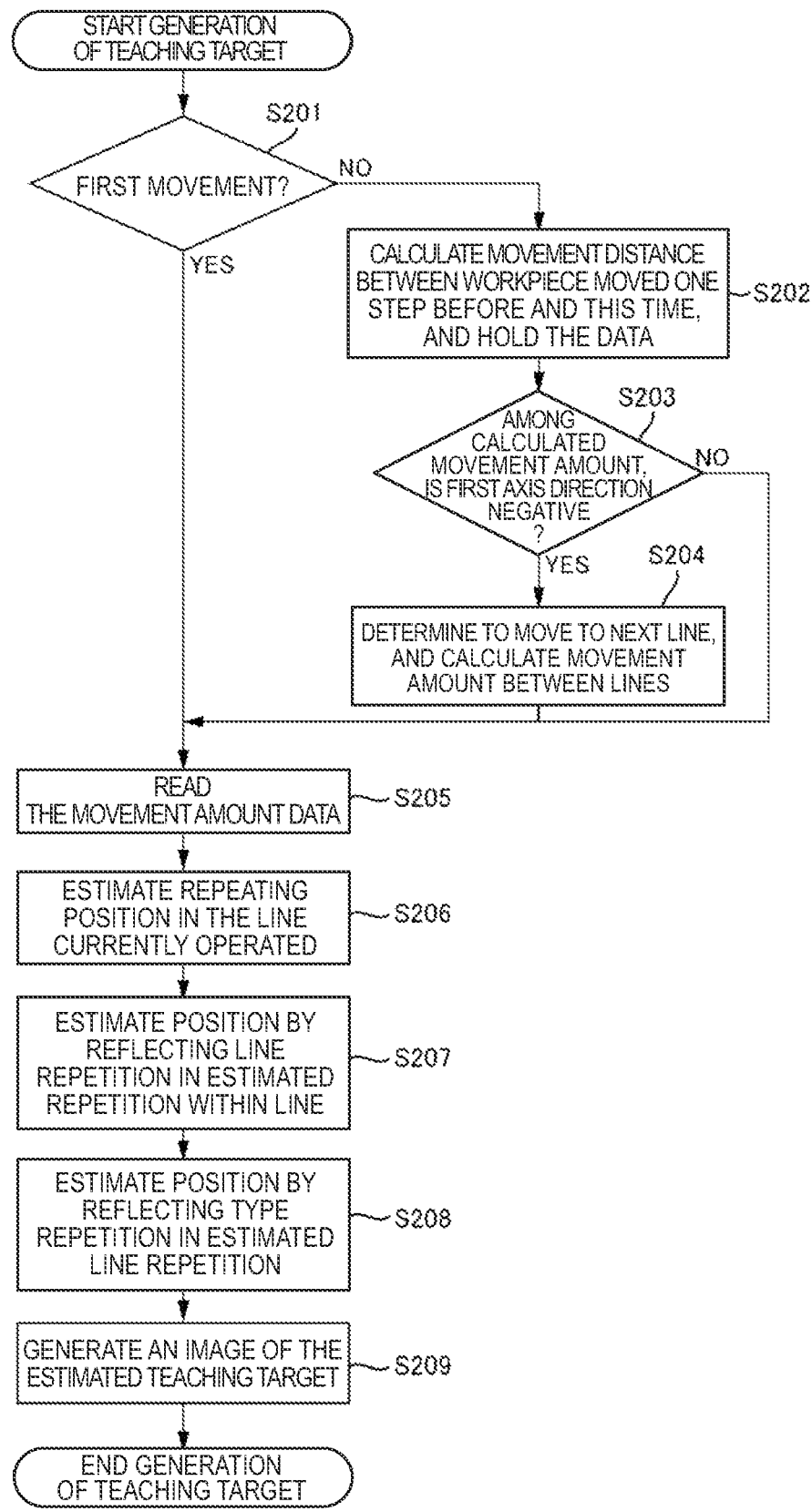
FIG. 11 is a flowchart for explaining an example of the teaching method of the present disclosure.

FIG. 1 is a diagram illustrating overall configuration of a robotic system according to a first embodiment. FIG. 2 is a block diagram of the robotic system shown in FIG. 1. FIG. 3 is a diagram illustrating an example of a target arrangement pattern. FIG. 4 is an imaging result in which a state of performing a model operation is imaged. FIG. 5 is a list of candidate arrangement patterns displayed on a display section. FIG. 6 is an imaging result in which a state of performing a model operation is imaged. FIG. 7 is a list of candidate arrangement patterns displayed on the display section. FIG. 8 is an imaging result in which a state of performing a model operation is imaged. FIG. 9 is a list of candidate arrangement patterns displayed on the display section. FIG. 10 is a flowchart for explaining an example of the teaching method of the present disclosure. FIG. 11 is a flowchart for explaining an example of the teaching method of the present disclosure.

Regarding a robotic arm, in FIG. 1 an end portion on a base 11 side is referred to as a "base end", an end portion opposite from the base end, that is, on an end effector 20 side is referred to as a "tip end", and regarding the end effector 20 and a force detection section 19, an end portion on the robotic arm 10 side is referred to as a "base end", and an end portion opposite from the base end is referred to as a "tip end". A Z-axis direction in FIG. 1, that is, an up-down direction is referred to as a "vertical direction", and an X-axis direction and a Y-axis direction, that is, left-right directions are referred to as "horizontal directions".

As shown in FIGS. 1 and 2, a robotic system 100 includes a robot 1, a controller 3 for controlling the robot 1, a teaching device 4, and an imaging section 5, and executes the teaching method of the present disclosure.

First, the robot 1 will be described.

A robot 1 illustrated in FIG. 1 is a single arm 6-axis vertical articulated robot in the present embodiment, and includes the base 11 and the robotic arm 10. Further, the end effector 20 can be attached to the tip end of the robotic arm 10. The end effector 20 may be a component of the robot 1 or may not be a component of the robot 1.

Note that the robot 1 is not limited to the illustrated configuration, and may be, for example, a double arm articulated robot. Further, the robot 1 may be a horizontal articulated robot.

The base 11 is a support member that supports the robotic arm 10 so as to be drivable from below, and is fixed to, for example, the floor in a factory. The base 11 of the robot 1 is electrically connected to the controller 3 via a relay cable 18. Note that the connection between the robot 1 and the controller 3 is not limited to a wired connection as in the configuration shown in FIG. 1 but may be, for example, a wireless connection or may be connected via a network such as the Internet.

In the present embodiment, the robotic arm 10 includes a first arm 12, a second arm 13, a third arm 14, a fourth arm 15, a fifth arm 16, and a sixth arm 17, and these arms are connected in this order from the base 11 side. The number of arms included in the robotic arm 10 is not limited to six, and may be, for example, one, two, three, four, five, or seven or more. In addition, the size such as the total length of each arm is not particularly limited, and can be appropriately set.

The base 11 and the first arm 12 are connected via a joint 171. The first arm 12 is rotatable with respect to the base 11 around a first rotation axis, which is parallel to the vertical direction, as the rotation center. The first rotation axis coincides with a line normal to the floor to which the base 11 is fixed.

The first arm 12 and the second arm 13 are connected via a joint 172. The second arm 13 is rotatable with respect to the first arm 12 around a second rotation axis, which is parallel to the horizontal direction, as the rotation center. The second rotation axis is parallel to an axis orthogonal to the first rotation axis.

The second arm 13 and the third arm 14 are connected via a joint 173. The third arm 14 is rotatable with respect to the second arm 13 around a third rotation axis, which is parallel to the horizontal direction, as the rotation center. The third rotation axis is parallel to the second rotation axis.

The third arm 14 and the fourth arm 15 are connected via a joint 174. The fourth arm 15 is rotatable with respect to the third arm 14 around a fourth rotation axis, which is parallel to the central axis direction of the third arm 14, as a rotation center. The fourth rotation axis is orthogonal to the third rotation axis.

The fourth arm 15 and the fifth arm 16 are connected via a joint 175. The fifth arm 16 is rotatable with respect to the fourth arm 15 around a fifth rotation axis as a rotation center. The fifth rotation axis is orthogonal to the fourth rotation axis.

The fifth arm 16 and the sixth arm 17 are connected via a joint 176. The sixth arm 17 is rotatable with respect to the fifth arm 16 around a sixth rotation axis as a rotation center. The sixth rotation axis is orthogonal to the fifth rotation axis.

Further, the sixth arm 17 is a front end portion of robot, which is located at the end side of the robotic arm 10 furthest to the front. The sixth arm 17 can rotate together with the end effector 20 by driving the robotic arm 10.

The robot 1 includes a motor M1, a motor M2, a motor M3, a motor M4, a motor M5, and a motor M6 as driving sections, and an encoder E1, an encoder E2, an encoder E3, an encoder E4, an encoder E5, and an encoder E6. The motor M1 is built in the joint 171, and rotates the base 11 and the first arm 12 relatively. The motor M2 is built in the joint 172, and rotates the first arm 12 and the second arm 13 relatively. The motor M3 is built in the joint 173, and rotates the second arm 13 and the third arm 14 relatively. The motor M4 is built in the joint 174, and rotates the third arm 14 and the fourth arm 15 relatively. The motor M5 is built in the joint 175, and rotates the fourth arm 15 and the fifth arm 16 relatively. The motor M6 is built in the joint 176, and rotates the fifth arm 16 and the sixth arm 17 relatively.

The encoder E1 is built in the joint 171 and detects the position of the motor M1. The encoder E2 is built in the joint 172 and detects the position of the motor M2. The encoder E3 is built in the joint 173 and detects the position of the motor M3. The encoder E4 is built in the joint 174 and detects the position of the motor M4. The encoder E5 is built in the joint 175 and detects the position of the motor M5. The encoder E6 is built in the joint 176 and detects the position of the motor M6.

The encoder E1 to the encoder E6 are electrically connected to the controller 3, and position information of the motor M1 to the motor M6, that is rotation amount, is transmitted to the controller 3 as an electrical signal. Then, based on this information, the controller 3 drives the motor M1 to the motor M6 via a motor driver D1 to a motor driver D6. That is, controlling the robotic arm 10 is controlling the motor M1 to the motor M6.

Further, a control point CP is set at the tip end of the force detection section 19 provided in the robotic arm 10. The control point CP serves as a reference point when the robotic arm 10 is controlled. The robotic system 100 grasps the position of the control point CP in a robot coordinate system, and drives the robotic arm 10 so that the control point CP moves to a desired position. In other words, the control point CP is provided to the robotic arm 10 side rather than to the end effector 20. In the present embodiment, the control point CP is set at the tip end of the force detection section 19, but if the position and the posture from the origin of the robot coordinate system are known, the control point CP may be set at any position on the robotic arm 10 side rather than to the end effector 20. For example, it may be set at the tip end of the robotic arm 10.

In the robot 1, the force detection section 19 that detects a force is detachably attached to the robotic arm 10. Then, the robotic arm 10 can be driven in a state where the force detection section 19 is attached. The force detection section 19 is a six axis force sensor in the present embodiment. The force detection section 19 detects the magnitude of the force along three detection axes that are orthogonal to each other and the magnitude of the torque around the three detection axes. That is, force components in each of the axial directions of the X axis, the Y axis, and the Z axis, which are orthogonal to each other, and a force component in the W direction around the X axis, a force component in the V direction around the Y axis, and a force component in the U direction around the Z axis are detected. In this embodiment, the Z-axis direction is the vertical direction. A force component in each axis direction may be referred to as a "translational force component", and a force component around each axis may be referred to as a "torque component". Further, the force detection section 19 is not limited to the six axis force sensor and may have another configuration.

In the present embodiment, the force detection section 19 is installed on the sixth arm 17. Note that the location where the force detection section 19 is installed is not limited to the sixth arm 17, that is, to the arm located on the most tip end side, and may be, for example, another arm or between adjacent arms.

The end effector 20 can be detachably attached to the force detection section 19. In the present embodiment, the end effector 20 is composed of a hand that sucks and holds a workpiece W as an object. The end effector 20 is not limited to the illustrated configuration, and may be, for example, a hand that holds the object by clamping.

In the robot coordinate system, a tool center point TCP, which is a first control point, is set at the tip end of the end effector 20. In the robotic system 100, the tool center point TCP can be used as a reference for control by grasping the position of the tool center point TCP in the robot coordinate system. In robotic system 100, the position of the control point CP, which is the second control point set on the robotic arm 10, is grasped in the robot coordinate system. Therefore, by grasping the positional relationship between the tool center point TCP and the control point CP, it is possible to drive the robotic arm 10 using the tool center point TCP as a reference of control and perform operations. Such grasping of the positional relationship between the tool center point TCP and the control point CP is referred to as "calibration".

Next, the imaging section 5 will be described.

The imaging section 5 can be configured to include, for example, an image sensor configured by a charge coupled device (CCD) image sensor having a plurality of pixels, and an optical system including a lens and the like. As shown in FIG. 2, the imaging section 5 is electrically connected to the controller 3. The imaging section 5 converts light received by the image sensor into an electric signal and outputs the electric signal to the controller 3. That is, the imaging section 5 transmits an imaging result to the controller 3. Note that the imaging result may be a still image or a moving image.

In addition, the imaging section 5 is installed in such an orientation as to image the −Z axis side from the +Z axis side. Specifically, the imaging section 5 images the working region of the robot 1, that is, the pre-movement region A1 and the post-movement region A2 as illustrated in FIG. 4. Note that a plurality of imaging sections 5 may be provided. In this case, the robotic system 100 may have a dedicated imaging section for imaging the pre-movement region A1 and a dedicated imaging section for imaging the post-movement region A2.

Next, the controller 3 will be described.

As shown in FIGS. 1 and 2, in the present embodiment, the controller 3 is installed at a place separated from the robot 1. However, the present embodiment is not limited to this configuration, and it may be built in the base 11. The controller 3 has a function of controlling the drive of the robot 1, and is electrically connected to each section of the robot 1 described above. The controller 3 includes a processor 31, a storage section 32, and a communication section 33. These sections are communicably connected to each other via, for example, a bus.

The processor 31 is composed of, for example, a central processing unit (CPU), and reads and executes various programs and the like stored in the storage section 32. The signal generated by the processor 31 is transmitted to the robot 1 via the communication section 33. By this, the robotic arm 10 can execute a predetermined operation.

The storage section 32 stores various programs and the like executable by the processor 31. Examples of the storage section 32 include a volatile memory such as a random access memory (RAM), a non-volatile memory such as a read only memory (ROM), and a detachable external storage device.

The communication section 33 transmits and receives signals to and from each section of the robot 1 and the teaching device 4 by using, for example, an external interface such as a wired local area network (LAN) or a wireless LAN.

Next, the teaching device 4 will be described.

As shown in FIGS. 1 and 2, the teaching device 4 has a function of creating and inputting an operation program to the robotic arm 10. The teaching device 4 includes a processor 41, a storage section 42, and a communication section 43. The teaching device 4 is not particularly limited, and examples thereof include a tablet, a personal computer, a smartphone, a teaching pendant and a like having a display section 40.

The processor 41 is constituted by, for example, a central processing unit (CPU), and reads and executes various programs such as a teaching program stored in the storage section 42, and controls the operation of the display section 40. The teaching program may be generated by the teaching device 4, may be stored from an external storage medium such as a CD-ROM, or may be stored via a network or the like.

The signal generated by the processor 41 is transmitted to the controller 3 of the robot 1 via the communication section 43. By this, the robotic arm 10 can execute a predetermined operation under a predetermined condition.

The storage section 42 stores various programs that can be executed by the processor 41. Examples of the storage section 42 include a volatile memory such as a random access memory (RAM), a non-volatile memory such as a read only memory (ROM), and a detachable external storage device.

The communication section 43 transmits and receives signals to and from the controller 3 using an external interface such as a wired local area network (LAN) or a wireless LAN.

The robotic system 100 has been described above.

In such a robotic system 100, before the robot 1 performs a predetermined operation, an operation program for the operation to be performed by the robot 1 is created, that is, teaching is performed. Hereinafter, an operation of arranging workpieces W as illustrated in FIG. 3 in the post-movement region A2 will be described as an example of an operation performed by the robot 1. In the following description, the workpieces W include two types of workpieces, workpiece WA and workpiece WB.

In order to cause the robot 1 to execute the operation of arranging the workpieces W as shown in FIG. 3, teaching is performed as follows. First, the operator actually moves the workpieces W from the pre-movement region A1 to the post-movement region A2, and obtains an arrangement pattern as shown in FIG. 3. This operation is hereinafter also referred to as a model operation. While the operator is performing the model operation, imaging is performed using the imaging section 5, and the robotic system 100 stores a result of the model operation based on the imaging result, so that teaching is performed.

In the related art method, the model operation needs to be performed from beginning to end. That is, as shown in FIG. 3, it is necessary to perform the operation until all of the eight workpieces W are moved to obtain the target arrangement pattern. Therefore, it takes a relatively long time. On the other hand, in the present disclosure, the time required for the teaching can be shortened by the following method.

First, as shown in FIG. 4, the first workpiece W, that is, a workpiece WB is moved from the pre-movement region A1 to the post-movement region A2. At this time, the workpiece WB is arranged at a position in the post-movement region A2 that is biased toward the upper left side in FIG. 4. The robotic system 100 images an image of the operation with the imaging section 5 (imaging step), and recognizes the position of the imaged workpiece WB in the robot coordinate system (recognizing step). Next, target candidate arrangement patterns are estimated based on the recognized position of the workpiece WB (estimating step). That is, candidate arrangement patterns are obtained in which the workpiece WB is arranged at the position shown in FIG. 4. For example, as shown in FIG. 5, four candidates are obtained.

In the configuration illustrated in FIG. 5, a pattern of "1 End in current state", a pattern of "2 Repeat within line", a pattern of "1.1 Repeat lines", and a pattern of "2.1 Repeat lines" are estimated and displayed on the display section 40.

The pattern of "1 End in current state" is a pattern in which the process ends with one workpiece WB placed in the post-movement region A2. The pattern of "2 Repeat within line" is a pattern in which one workpiece WB is placed in the post-movement region A2 and this is repeated within the line, that is, in the lateral direction in FIG. 4.

The pattern "1.1 Repeat lines" is a pattern in which "1 End in current state" is repeated in the column direction, that is, in the vertical direction in FIG. 4. The pattern of "2.1 Repeat lines" is a pattern in which the pattern of "2 Repeat within line" is repeated in the column direction, that is, in the vertical direction in FIG. 4.

Such four candidate arrangement patterns are estimated from the arrangement of the first workpiece WB, and are presented to the operator. Then, if the target arrangement pattern exists among the four candidate arrangement patterns, the operator selects that arrangement pattern. As a result, it is not necessary to perform the entire model operation, and the time required for teaching can be shortened.

If the target arrangement pattern does not exist among the displayed candidate arrangement patterns, the model operation is continued. That is, the next workpiece W is moved to the post-movement region A2.

To be specific, as shown in FIG. 6, the second workpiece W, that is, a workpiece WA is moved from the pre-movement region A1 to the post-movement region A2. At this time, the workpiece WA is arranged in the post-movement region A2, in the vicinity of the workpiece WB arranged first. The robotic system 100 images an image of the operation using the imaging section 5 (imaging step), and recognizes the position of the imaged workpiece WA in the robot coordinate system (recognizing step). Next, target candidate arrangement patterns are estimated based on the recognized position of the workpiece WA (estimating step). That is, candidate arrangement patterns are obtained in which the workpiece WA is arranged at the position shown in FIG. 6. For example, as shown in FIG. 7, sixteen candidates are obtained.

In the configuration shown in FIG. 7, a pattern of "1 End in current state", a pattern of "2 Repeat within line", a pattern of "3 Repeat within line", a pattern of "4 Repeat within line", a pattern of "1.1 Repeat lines", a pattern of "1.2 Repeat lines", a pattern of "2.1 Repeat lines", a pattern of "2.2 Repeat lines", a pattern of "2.1.a Repeat types", a pattern of "2.2.a Repeat types", a pattern of "3.1 Repeat lines", a pattern of "3.2 Repeat lines", a pattern of "4.1 Repeat lines", a pattern of "4.2 Repeat lines", a pattern of "4.1.a Repeat types", and a pattern of "4.2.a Repeat types" are estimated and displayed on the display section 40.

The pattern of "1 End in current state" is a pattern in which the workpiece WB and the workpiece WA are placed one by one in the post-movement region A2 and ends. The pattern of "2 Repeat within line" is a pattern in which a workpiece WB, a workpiece WA, and a workpiece WB are placed in a staggered pattern in the post-movement region A2 and ends. The pattern of "3 Repeat within line" is a pattern in which two workpieces WB and two workpieces WA are placed in a staggered manner in the post-movement region A2 and ends. The pattern of "4 Repeat within line" is a pattern in which three workpieces WB and two workpieces WA are placed in a staggered pattern in the post-movement region A2 and ends.

The pattern of "1.1 Repeat lines" is a pattern in which the arrangement of "1 End in current state" is repeated twice in the column direction, that is, the vertical direction in FIG. 7. The pattern of "1.2 Repeat lines" is a pattern in which the arrangement of "1 End in current state" is repeated three times in the column direction, that is, in the vertical direction in FIG. 7. The pattern of "2.1 Repeat lines" is a pattern in which the arrangement of "2 Repeat within line" is repeated twice in the column direction, that is, in the vertical direction in FIG. 7. The pattern of "2.2 Repeat lines" is a pattern in which the arrangement of "2 Repeat within line" is repeated three times in the column direction, that is, in the vertical direction in FIG. 7.

The pattern of "2.1.a Repeat types" is a pattern in which the arrangement of "2 Repeat within line" is repeated twice in the column direction, that is, in the vertical direction in FIG. 7. Here, in the second repetition, the arrangement of workpiece WA and workpiece WB is reversed from that of the first repetition.

The pattern of "2.2.a Repeat types" is a pattern in which the arrangement of "2 Repeat within line" is repeated three times in the column direction, that is, in the vertical direction in FIG. 7. Here, in the second repetition, the arrangement of workpiece WA and workpiece WB is reversed from that of the first repetition, and in the third repetition, the arrangement of workpiece WA and workpiece WB is the same as that of the first repetition.

The pattern of "3.1 Repeat lines" is a pattern in which the arrangement of "3 Repeat within line" is repeated twice in the column direction, that is, the vertical direction in FIG. 7. The pattern of "3.2 Repeat lines" is a pattern in which the arrangement of "3 Repeat within line" is repeated three times in the column direction, that is, in the vertical direction in FIG. 7.

The pattern of "4.1 Repeat lines" is a pattern in which the arrangement of "4 Repeat within line" is repeated twice in the column direction, that is, in the vertical direction in FIG. 7. The pattern of "4.2 Repeat lines" is a pattern in which the arrangement of "4 Repeat within line" is repeated three times in the column direction, that is, the vertical direction in FIG. 7.

The pattern of "4.1.a Repeat types" is a pattern in which the arrangement of "4 Repeat within line" is repeated twice in the column direction, that is, in the vertical direction in FIG. 7. The pattern of "4.2.a Repeat types" is a pattern in which the arrangement of "4 Repeat within line" is repeated three times in the column direction, that is, the vertical direction in FIG. 7. Here, in the second repetition, the arrangement of workpiece WA and workpiece WB is reversed from that of the first repetition, and in the third repetition, the arrangement of workpiece WA and workpiece WB is the same as that of the first repetition.

Such sixteen candidate arrangement patterns are estimated from the arrangement of the workpiece WB and workpiece WA, and presented to the operator. Then, if the target arrangement pattern exists among the sixteen candidate arrangement patterns, the operator selects the arrangement pattern. As a result, it is not necessary to perform the entire model operation, and the time required for teaching can be shortened.

If the target arrangement pattern does not exist among the displayed candidate arrangement patterns, the model operation is continued. That is, the next workpiece W is moved to the post-movement region A2.

To be specific, as shown in FIG. 8, the third workpiece W, that is, a workpiece WB is moved from the pre-movement region A1 to the post-movement region A2. At this time, a workpiece WB is arranged in the post-movement region A2 in the vicinity of the second workpiece WA. The robotic system 100 images an image of the operation using the imaging section 5 (imaging step), and recognizes the position of the imaged workpiece WA in the robot coordinate system (recognizing step). Next, target candidate arrangement patterns are estimated based on the recognized position of the workpiece WA (estimating step). That is, candidate arrangement patterns are obtained in which the workpiece WA is arranged at the position shown in FIG. 8. For example, as shown in FIG. 9, five candidates are obtained.

In the configuration shown in FIG. 7, a pattern of "1 End in current state", a pattern of "2 Repeat within line", a pattern of "1.1 Repeat lines", a pattern of "2.1 Repeat lines", and a pattern of "2.1.a Repeat types" are estimated and displayed on the display section 40.

The pattern of "1 End in current state" is a pattern in which the workpiece WB, the workpiece WA, and the workpiece WB are sequentially arranged in an inclined linear shape in the post-movement region A2. The pattern of "2 Repeat within line" is a pattern in which the arrangement of "1 End in current state" is repeatedly placed in the line direction, that is, in the horizontal direction in FIG. 9.

The pattern of "1.1 Repeat lines" is a pattern in which the arrangement of "1 End in current state" is repeated twice in the column direction, that is, the vertical direction in FIG. 9. The pattern of "2.1 Repeat lines" is a pattern in which the arrangement of "2 Repeat within line" is repeated twice in the column direction, that is, in the vertical direction in FIG. 9. The pattern of "2.1.a Repeat types" is a pattern in which the arrangement of "2 Repeat within line" is repeated twice in the column direction, that is, in the vertical direction in FIG. 9. Here, in the second repetition, the arrangement of workpiece WA and workpiece WB is reversed from that of the first repetition.

Such five candidate arrangement patterns are estimated from the arrangement of the workpieces WB and the workpiece WA, and presented to the operator. Then, if the target arrangement pattern exists among the five candidate arrangement patterns, then the operator selects that arrangement pattern. As a result, it is not necessary to perform the entire model operation, and the time required for teaching can be shortened.

A selection candidate that is a candidate selected from among the displayed candidates is stored as an arrangement pattern (storage step), and an operation program of the robot 1 is generated using the stored arrangement pattern (generating step), whereby the teaching is completed.

If the target arrangement pattern does not exist among the displayed candidate arrangement patterns, the model operation is continued. That is, the next workpiece W is moved to the post-movement region A2. By repeating such an operation, the time can be shortened as compared with the related art teaching methods.

As described above, the teaching method according to the present disclosure is a teaching method for generating the operation program of the robot 1 based on the operation in which the operator sequentially moves the workpieces W, which are a plurality of objects, to the post-movement region A2, which is the arrangement region, and arranges the workpieces W so as to form a target arrangement pattern. In addition, the teaching method includes the imaging step of imaging the workpiece W moved to the post-movement region A2 during the operation, the recognizing step of recognizing the position of the workpiece W imaged in the imaging step, the estimating step of estimating candidate arrangement patterns based on the position of the workpiece W recognized in the recognizing step, and the display step of displaying the candidate estimated in the estimating step. As a result, it is possible to increase the possibility that teaching can be completed without performing to the end the operation of arranging the workpieces W into the target arrangement pattern as in the related art method. Therefore, the time required for the teaching can be shortened.

Further, the teaching method of the present disclosure has the storage step of storing a selection candidate selected from the displayed candidates as the arrangement pattern in the display step. Thus, the selection candidates selected by the operator can be stored.

The teaching method of the present disclosure includes the generating step of generating the operation program of the robot 1 by using the arrangement pattern stored in the storage step. As a result, it is possible to generate an operation program in which the robot 1 can perform operation to obtain a desired arrangement pattern.

In addition, the case where the workpiece W includes two different types of workpieces W (workpiece WA and workpiece WB) has been described, but the present disclosure is not limited to this, and for example, the workpiece W may include a workpiece having at least one difference among shape, dimension, color, pattern, or material.

As described above, the workpieces W as objects have at least one difference in type, shape, dimension, color, pattern, or material, and in the recognizing step, the position of the object is recognized for each difference, and in the estimating step, candidate arrangement patterns of the workpieces W are estimated in consideration of the difference. This makes it possible to teach an arrangement pattern in consideration of differences.

Further, for example, it is conceivable that the number of possible candidate arrangement patterns is relatively large, just by moving one or two workpieces W. Therefore, display of the candidate arrangement patterns may be omitted until the number becomes equal to or less than a predetermined number, for example, n (n is an integer of 3 or more). As a result, the process can be simplified, and it is possible to prevent or suppress the operator from taking too much time to select the candidate.

In this way, when there exists a plurality of candidate arrangement patterns of the workpieces W, which are the objects estimated in the estimating step, the imaging step, the recognizing step and the estimating step are repeatedly performed until the number of candidates becomes n or less (n is an integer of 3 or more), and the estimated n number of candidates are displayed in the display step. As a result, the process can be simplified, and it is possible to prevent or suppress the operator from taking too much time to select the candidate.

An example of a teaching method of the present disclosure will be described below with reference to the flowcharts shown in FIGS. 10 and 11.

First, in step S101, setting information is read. That is, the type of the robotic arm 10, the type of the end effector 20, and the like are set. Next, in step S102, workpiece registration is performed. That is, what type of workpiece will be used as the workpiece W is registered.

Next, in step S103, pre-movement and post-movement region registration is performed. That is, the positions of the pre-movement region A1 and the post-movement region A2 are registered. Next, in step S104, pre-teaching workpiece recognition is performed. That is, it is recognized that a workpiece W is placed in the pre-movement region A1.

Next, in step S105, the operator performs a teaching operation, that is, the above-described model operation. Next, in step S106, it is determined whether or not one movement has been completed. The determination in this step is made based on, for example, whether or not the workpiece W is in a state of being stopped for a predetermined time in the post-movement region A2.

If it is determined in step S106 that one movement has been completed, post-movement workpiece recognition is performed in step S107. That is, the position of the workpiece W in the post-movement region A2 is estimated. If it is determined in step S106 that one movement has not been completed, step S106 is repeated.

Next, in step S108, a teaching target is generated. This step will be described in detail later.

Next, in step S109, it is determined whether or not a teaching target has been generated. The determination in this step is made based on whether or not the operator has pressed a teaching completion button (not shown) using, for example, the teaching device 4. If it is determined in step S109 that the teaching target has been generated, teaching ends. On the other hand, if it is determined that the teaching target has not been generated, the process returns to step S104 and step S104 and the subsequent steps are repeated.

Next, step S108 will be described.

In step S108, as shown in FIG. 11, step S201 to step S209 are sequentially performed. First, in step S201, it is determined whether or not the operation is the first movement. If it is determined in step S201 that the operation is the first movement, the process proceeds to step S205. If it is determined in step S201 that the operation is not the first movement, the process proceeds to step S202.

In step S202, a movement distance between the workpiece W moved one step before and the workpiece W moved this time is calculated, and the data is held. That is, the separation distance between the workpiece W moved last time and the workpiece W moved this time is calculated, and the calculation result is stored.

Next, in step S203, it is determined whether or not, among the movement amounts calculated in step S202, a first axis direction (for example, a direction along the moving direction) is negative. That is, it is determined whether or not the amount of deviation between the workpiece W moved last time and the workpiece W moved this time is a deviation in a preset direction. The determination in this step is made by analyzing, in the captured image, in which direction it is shifted.

If it is determined to be negative in step S203, then in step S204 it is determined that it moved to the next line and the amount of movement between lines is calculated. That is, it is grasped how far the next line is separated. On the other hand, if it is determined in step S203 that it is not negative, the process proceeds to step S205.

Next, in step S205, the data of the amount of movement, that is, the amount of deviation between the previously moved workpiece W and the workpiece W moved this time is read, and in step S206, the repeating position in the line that is currently being operated in is estimated. Next, in step S207, the position is estimated by reflecting the line repetition in the estimated repetition within the line. Next, in step S208, the position is estimated by reflecting type repetition in the estimated line repetition. Then, in step S209, an image of the estimated teaching target, that is, the target arrangement pattern is generated.

Through such steps, candidate arrangement patterns as shown in FIGS. 5, 7, and 9 can be generated and displayed, for example.

2. Second Embodiment

Figure 12:
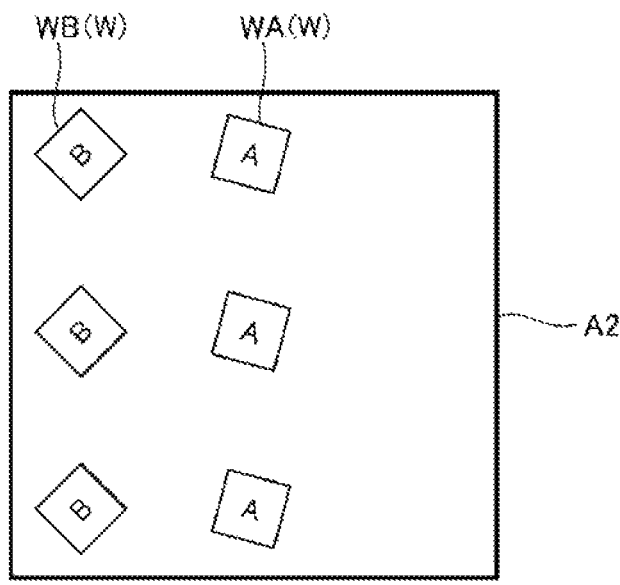
FIG. 12 is a diagram illustrating an example of a target arrangement pattern in a teaching method executed by a robotic system according to a second embodiment.
Figure 13:
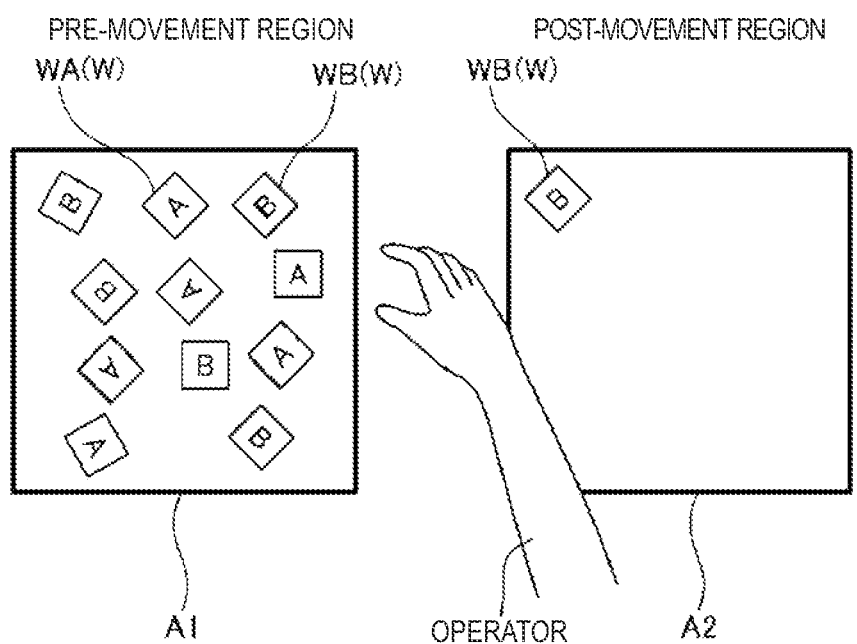
FIG. 13 is an imaging result in which a state of performing a model operation is imaged.
Figure 14:
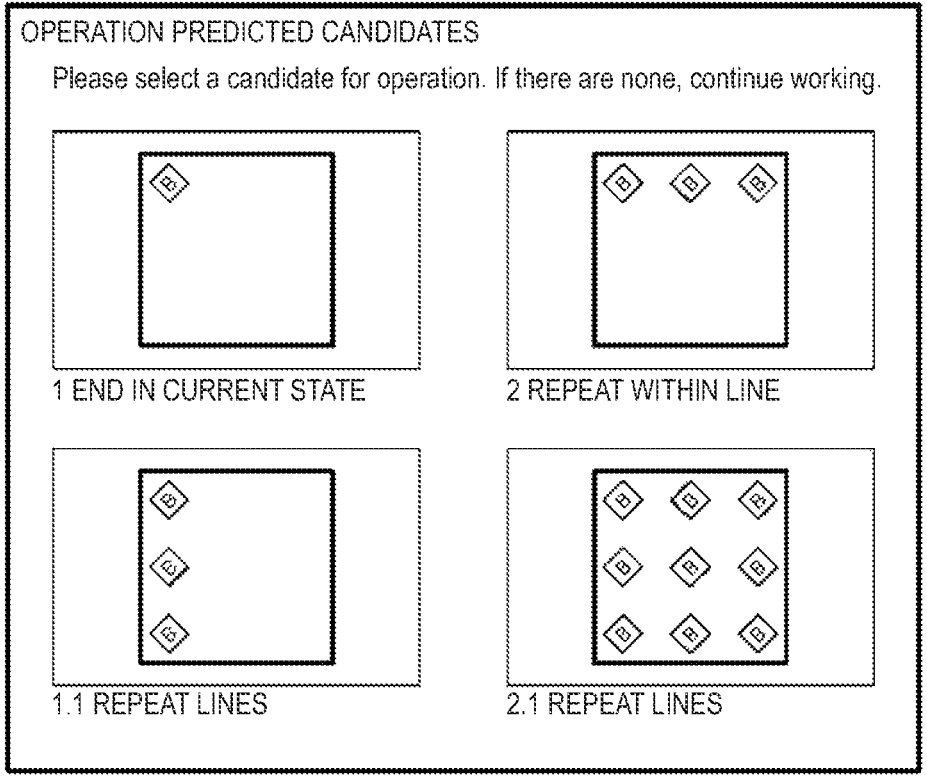
FIG. 14 is a list of candidate arrangement patterns displayed on the display section.
Figure 15:
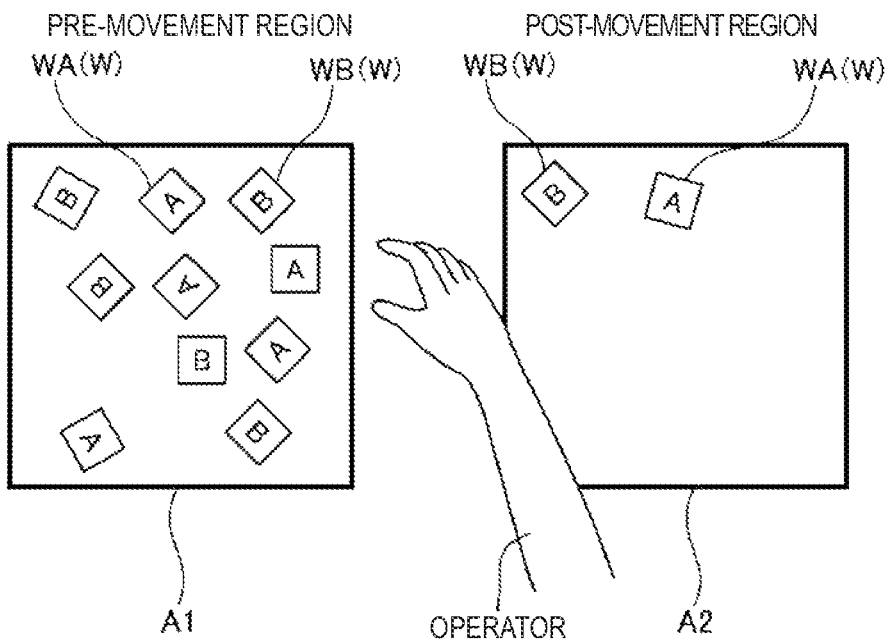
FIG. 15 is an imaging result in which a state of performing a model operation is imaged.
Figure 16:
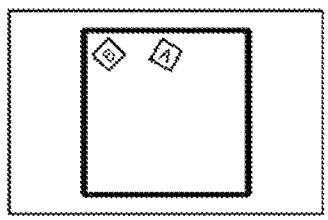
FIG. 16 is a list of candidate arrangement patterns displayed on a display section.
Figure 16:
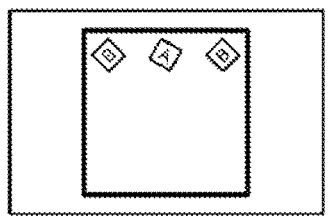
Figure 16:
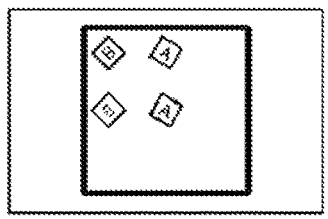
Figure 16:
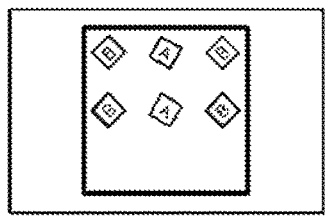
Figure 16:
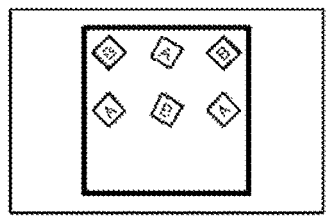
Figure 16:
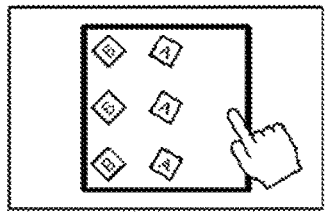
Figure 16:
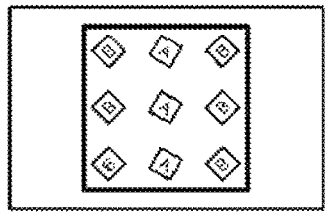
Figure 16:
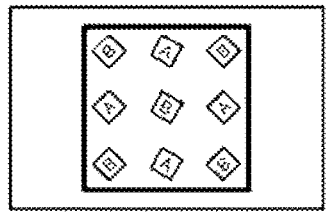

FIG. 12 is a diagram illustrating an example of a target arrangement pattern in a teaching method executed by a robotic system according to a second embodiment. FIG. 13 is an imaging result in which a state of performing a model operation is imaged. FIG. 14 is a list of candidate arrangement patterns displayed on the display section. FIG. 15 is an imaging result in which a state of performing a model operation is imaged. FIG. 16 is a list of candidate arrangement patterns displayed on a display section.

Hereinafter, a second embodiment of the teaching method of the present disclosure will be described, but in the following description, differences from the first embodiment will be mainly described, and a description of similar matters will be omitted.

In the present embodiment, the target arrangement pattern is assumed to be an arrangement pattern as shown in FIG. 12. That is, the workpieces WA and the workpieces WB are arranged in a grid pattern of three lines and two columns. The workpieces WA and the workpieces WB are arranged in different postures.

First, as shown in FIG. 13, the first workpiece W, that is, a workpiece WB is moved from the pre-movement region A1 to the post-movement region A2. At this time, the workpiece WB is arranged at a position unevenly distributed on the upper left side in FIG. 13 in the post-movement region A2. The robotic system 100 images an image of the operation with the imaging section 5 (imaging step), and recognizes the position of the imaged workpiece WB in the robot coordinate system (recognizing step). Next, target candidate arrangement patterns are estimated based on the recognized position of the workpiece WB (estimating step). That is, candidate arrangement patterns are obtained in which the workpiece WB is arranged at the position shown in FIG. 13. For example, as shown in FIG. 14, four candidates are obtained.

In the configuration illustrated in FIG. 14, a pattern of "1 End in current state", a pattern of "2 Repeat within line", a pattern of "1.1 Repeat lines", and a pattern of "2.1 Repeat lines" are estimated and displayed in the display section 40.

The pattern of "1 End in current state" is a pattern in which the process ends with one workpiece WB placed in the post-movement region A2. The pattern of "2 Repeat within line" is a pattern in which one workpiece WB is placed in the post-movement region A2 and is repeated within the line, that is, in the lateral direction in FIG. 14. The pattern "1.1 Repeat lines" is a pattern in which "1 End in current state" is repeated in the column direction, that is, in the vertical direction in FIG. 14. The pattern of "2.1 Repeat lines" is a pattern in which the pattern of "2 Repeat within line" is repeated in the column direction, that is, in the vertical direction in FIG. 14. Note that in the four patterns, the postures of the workpieces WB are all the same.

Such four candidate arrangement patterns are estimated from the arrangement of the first workpiece WB, and are presented to the operator. Then, if the target arrangement pattern exists among the four candidate arrangement patterns, the operator selects that arrangement pattern. As a result, it is not necessary to perform the entire model operation, and the time required for teaching can be shortened.

If the target arrangement pattern does not exist among the displayed candidate arrangement patterns, the model operation is continued. That is, the next workpiece W is moved to the post-movement region A2.

To be specific, as shown in FIG. 15, the second workpiece W, that is, a workpiece WA is moved from the pre-movement region A1 to the post-movement region A2. At this time, the workpiece WA is arranged in the post-movement region A2, in the vicinity of the workpiece WB arranged first. Note that the posture of the workpiece WA is different from the posture of the workpiece WB. The robotic system 100 images an image of the operation using the imaging section 5 (imaging step), and recognizes the position of the imaged workpiece WA in the robot coordinate system (recognizing step). Next, target candidate arrangement patterns are estimated based on the recognized position of the workpiece WA (estimating step). That is, candidate arrangement patterns are obtained in which the workpiece WA is arranged at the position shown in FIG. 15. For example, as shown in FIG. 16, eight candidates are obtained.

In the configuration shown in FIG. 16, patterns of "1 End in current state", "2 Repeat within line", "1.1 Repeat lines", "1.2 Repeat lines", "2.1 Repeat lines", "2.2 Repeat lines", "2.1.a Repeat types", and "2.2.a Repeat types" are estimated and displayed on the display section 40.

The pattern of "1 End in current state" is a pattern in which the workpiece WB and the workpiece WA are placed one by one in the post-movement region A2 and ends. The pattern of "2 Repeat within line" is a pattern that ends with the workpiece WB, the workpiece WA, and the workpiece WB linearly placed in the post-movement region A2.

The pattern of "1.1 Repeat lines" is a pattern in which the arrangement of "1 End in current state" is repeated twice in the column direction, that is, the vertical direction in FIG. 16. The pattern of "1.2 Repeat lines" is a pattern in which the arrangement of "1 End in current state" is repeated three times in the column direction, that is, in the vertical direction in FIG. 16. The pattern of "2.1 Repeat lines" is a pattern in which the arrangement of "2 Repeat within line" is repeated twice in the column direction, that is, in the vertical direction in FIG. 16. The pattern of "2.2 Repeat lines" is a pattern in which the arrangement of "2 Repeat within line" is repeated three times in the column direction, that is, in the vertical direction in FIG. 16.

The pattern of "2.1.a Repeat types" is a pattern in which the arrangement of "2 Repeat within line" is repeated twice in the column direction, that is, in the vertical direction in FIG. 16. Here, in the second repetition, the arrangement of workpiece WA and workpiece WB is reversed from that of the first repetition.

The pattern of "2.2.a Repeat types" is a pattern in which the arrangement of "2 Repeat within line" is repeated three times in the column direction, that is, in the vertical direction in FIG. 16. Here, in the second repetition, the arrangement of workpiece WA and workpiece WB is reversed from that of the first repetition, and in the third repetition, the arrangement of workpiece WA and workpiece WB is the same as that of the first repetition.

Eight candidate arrangement patterns are estimated from the arrangement of the workpiece WB and workpiece WA, and are presented to the operator. Then, if the target arrangement pattern exists in the eight candidate arrangement patterns, the operator selects that arrangement pattern. As a result, it is not necessary to perform the entire model operation, and the time required for teaching can be shortened.

If the target arrangement pattern does not exist among the displayed candidate arrangement patterns, the model operation is continued. That is, the next workpiece W is moved to the post-movement region A2.

As described above, according to the present embodiment, in the recognizing step, in addition to the position of the workpiece W which is the object, the posture of the workpiece W arranged in the post-movement region A2, which is the arrangement region, is recognized, and in the estimating step, the candidate arrangement patterns of the workpiece W are estimated taking the posture of the workpiece W into consideration. This makes it possible to teach taking the posture of the workpiece W into consideration.

Figure 17:
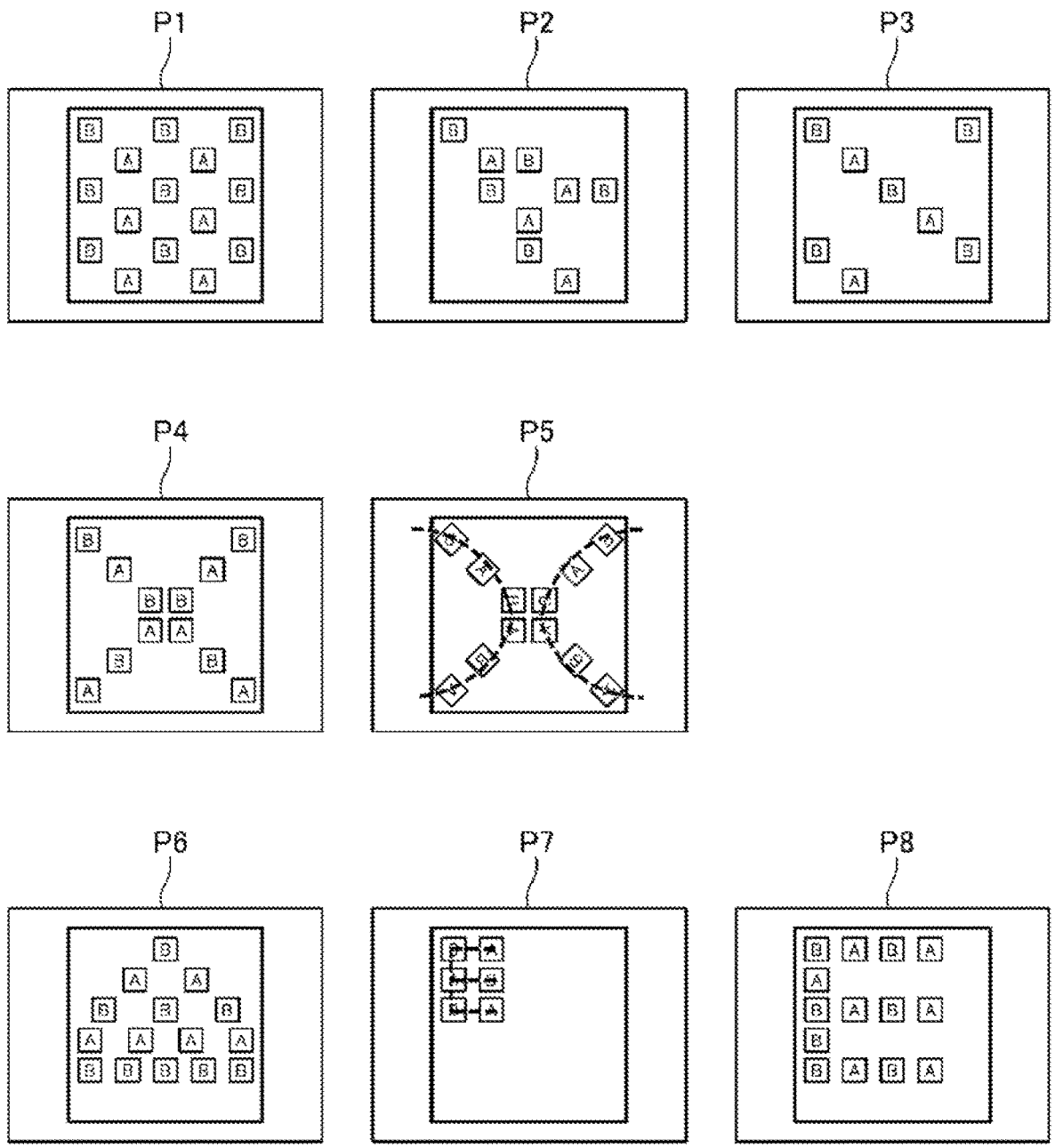
FIG. 17 is a diagram illustrating other examples of arrangement patterns.

Next, other example arrangement patterns will be described with reference to FIG. 17.

Other example arrangement patterns include a staggered arrangement pattern P1, a pattern P2 arranged along two diagonal lines, a pattern P3 arranged along diagonal lines parallel to each other, a pattern P4 arranged along intersecting straight lines, a pattern P5 arranged along arcs, a pattern P6 arranged so that the number of workpieces W in lines decreases with progress in one direction, and a pattern P7 and a pattern P8 arranged in "E" shapes.

The teaching method of the present disclosure can also be applied to such patterns.

Although the teaching method of the present disclosure has been described above with reference to the illustrated embodiments, the present disclosure is not limited thereto. In addition, each step of the teaching method can be replaced with an arbitrary step that can exhibit the same function. In addition, an arbitrary step may be added.

What is claimed is:

1. A teaching method for causing a processor to execute a program stored in a memory, the teaching method comprising executing on the processor the steps of:

arranging a plurality of objects on a pre-movement region, the plurality of objects including a first object and a second object;

moving the first object from the pre-movement region to a post-movement region;

imaging the first object and the post-movement region via an image sensor to generate a first image after the first object has been moved to the post-movement region;

recognizing a position of the first object on the post-movement region based on the first image;

estimating a plurality of first arrangement pattern candidates based on the recognized position of the first object, the plurality of first arrangement pattern candidates corresponding to a final arrangement pattern of the plurality of objects on the post-movement region;

displaying the plurality of first arrangement pattern candidates on a display;

selecting a first candidate of the plurality of first arrangement pattern candidates when the first candidate corresponds to a target arrangement pattern of the plurality of objects on the post-movement region;

moving the second object from the pre-movement region to the post-movement region when the plurality of first arrangement pattern candidates do not include the target arrangement pattern;

imaging the first and second objects and the post-movement region via the image sensor to generate a second image after the first and second objects have been moved to the post-movement region;

recognizing a position of the second object on the post-movement region based on the second image;

estimating a plurality of second arrangement pattern candidates based on the recognized positions of the first and second objects, the plurality of second arrangement pattern candidates corresponding to the final arrangement pattern of the plurality of objects on the post-movement region;

displaying the plurality of second arrangement pattern candidates on the display;

selecting a second candidate of the plurality of second arrangement pattern candidates when the second candidate corresponds to the target arrangement pattern of the plurality of objects on the post-movement region;

generating an operation program of a robot based on either the first candidate or the second candidate; and operating the robot to work with the plurality of objects in response to the operation program.

2. The teaching method according to claim 1, further comprising:

in the memory, one of the first and second candidates, as an arrangement pattern, from one of the plurality of first and second pattern candidates displayed on the display.

3. The teaching method according to claim 2, wherein the operation program of the robot is generated by using the arrangement pattern stored in the memory.

4. The teaching method according to claim 1, wherein the plurality of objects have a difference in at least one of type, shape, dimension, color, pattern, or material, positions of the plurality of objects are recognized for each of the differences, and each of the plurality of first and second arrangement are pattern candidates is estimated in consideration of the differences.

5. The teaching method according to claim 1, wherein in addition to the position of the first object, a posture of the first object arranged on the post-movement region is recognized, and the plurality of first arrangement pattern candidates are estimated in consideration of the posture of the first object.

6. The teaching method according to claim 1, wherein the moving of the first object, the recognizing of the position, the estimating are repeatedly performed until the number of the plurality of first arrangement pattern candidates becomes n or less, n being an integer equal to or greater than 3, and the estimated n candidates are displayed.

* * * * *